United States Patent
Dixon et al.

(10) Patent No.: US 7,275,199 B2
(45) Date of Patent: Sep. 25, 2007

(54) METHOD AND APPARATUS FOR A MODIFIED PARITY CHECK

(75) Inventors: Robert Christopher Dixon, Austin, TX (US); Richard Nicholas, Pflugerville, TX (US); Kirk Edward Morrow, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 10/912,483

(22) Filed: Aug. 5, 2004

(65) Prior Publication Data

US 2006/0031743 A1 Feb. 9, 2006

(51) Int. Cl.
G11C 29/52 (2006.01)

(52) U.S. Cl. .............. 714/763; 711/2; 711/5; 714/773

(58) Field of Classification Search .......... 714/763, 714/773; 711/2, 5; G11C 29/52
See application file for complete search history.

(56) References Cited

U.S. PATENT DOCUMENTS 3,890,469 A * 6/1975 Kelly et al. ............... 370/369
2004/0186944 A1 * 9/2004 Tseng et al. .................. 711/2
2005/0188281 A1 * 8/2005 Nguyen et al. ............... 714/42

* cited by examiner

Primary Examiner—R. Stephen Dildine
(74) Attorney, Agent, or Firm—Stephen J. Walder, Jr.; D'Ann N. Rifai; Robert M. Carwell

(57) ABSTRACT

A method, an apparatus, and a computer program are provided for sequentially determining parity of stored data. Because of the inherent instabilities that exist in most memory arrays, data corruption can be a substantial problem. Parity checking and other techniques are typically employed to counteract the problem. However, with parity checking and other techniques, there are tradeoffs. Time required to perform the parity check, for example, can cause system latencies. Therefore, to reduce latencies, a trusted register can be included into a memory system to allow for immediate access to one piece of trusted data. By being able to read one piece of trusted data, the system can overlap the parity checking and delivery of a location of data with the reading of the next location of data from the memory array. Hence, a full cycle of latency can be eliminated without the reduction of the clock frequency.

23 Claims, 4 Drawing Sheets

METHOD AND APPARATUS FOR A MODIFIED PARITY CHECK

FIELD OF THE INVENTION

The present invention relates generally to memory arrays, and more particularly, to the error detection circuitry for a memory array.

DESCRIPTION OF THE RELATED ART

With the increasing complexity and speed of semiconductor devices, data integrity has become increasingly important, especially regarding data corruption in memory. There are a number of root causes of data integrity problems, such as gamma rays. Generally, data integrity problems exist in memories that retain data for long periods of time. Therefore, to preserve the integrity of the data, it must be checked. Certain error checking techniques and logic circuits, such as parity checking circuitry, can be employed to determine If the data has been corrupted. However, checking data causes latencies that reduce overall performance.

An example of an error detection circuitry is parity checking. There are also a variety of other techniques and correction circuits that can be employed. Referring to FIG. 1 of the drawings, the reference numeral 100 generally designates a typical memory that utilizes a parity check. The memory 100 comprises a memory array 102 and a parity check 104.

A memory that includes parity typically stores one parity bit per byte (8 bits of data). For example, if a memory array location contains 8 bytes, the location would hold 72 memory bits (64 data plus 8 parity). Other configurations have been done, for example one parity bit per 32-bits of data, however one parity bit per byte is usually a good tradeoff between storage space and generation/calculation time. Parity typically comes in two flavors: even and odd. A given memory system will use either even or odd parity but not both. In an odd parity system, the parity generation circuit will make the number of ones in the byte including the parity bit odd. For example, if the data byte is 10110011, then the parity bit will be set to 0 so that the total number of ones is an odd number. In an even parity system, the parity generation circuit will make the number of ones in the byte including the parity bit even.

However, in order for the parity bit to be of at least some use, then it must be checked. When data is entered into a memory array, such as the memory array 102, parity is computed on the data and a parity bit is set. Then, when the data is extracted, the parity is calculated by a parity check, such as the parity check 104, and a comparison is made. If the stored parity of the byte does not match the calculated parity, then the data is presumed to be corrupted. Procedures can then be employed to rebuild the corrupted data.

In order to illustrate the functionality of the parity checking, certain data is entered into the memory 100. An address for a particular byte or bytes of data is entered into the memory array through a first communication channel 106. Data for a particular byte or bytes, including the parity bit or bits, is entered into the memory array 102 through a second communication channel 108, and a clocking signal is entered into the memory through a third communication channel 110. When the data is accessed, the data and stored parity bits are output through a fourth communication channel 112. Upon exit, the parity check 104 receives the data output, and checks the parity. It checks the parity by making sure the number of ones in the data and the parity bits are an odd number, in the case of an odd parity system. From there, the parity check 104 can output a parity_ok signal through a fifth communication channel 114.

The use of parity checking can be illustrated by examining a read operation. When a read operation occurs, an address is presented to the memory through the first communication channel 106. The data stored at the address then becomes available before the next rising edge of the clock at the memory output. Once the data in on the output, parity is generated and checked. As a result, additional time is required to perform the checking. The resultant latency can prevent the parity status from being available before the next clock cycle. Therefore, performance is limited by the parity checking because the maximum clock frequency is limited by the memory access time plus the parity check time.

A solution to the problem is to introduce a latch into the memory structure. Referring to FIG. 2 of the drawings, the reference numeral 200 generally designates a memory that includes a latched parity check. The memory 200 comprises a memory array 202, a latch 204, and a parity check 206.

A difference between the memory 100 and the memory 200 is the introduction of the latch. As with the memory 100, an address for a particular byte or bytes of data is entered into the memory array through a first communication channel 208. Data for a particular byte or bytes is entered into the memory array 202 through a second communication channel 210, and a clocking signal is entered into the memory through a third communication channel 212. When the data is accessed, the data is output through a fourth communication channel 214. However, upon exit, the parity check 206 does not immediately receive outputted data from the memory array 202. Instead, the outputted data is transmitted to the latch 204. The latch then propagates the data to the parity check 206 through a fifth communication channel 216. From there, the parity check 206 can output a parity_ok signal through a sixth communication channel 218.

With the memory 200, the simultaneity or near simultaneity of the parity of checking with the output of data is eliminated. The memory 100 includes a parity check in the same clock cycle that the data becomes valid. However, the memory 200 parity check uses previously latched data. Hence, the parity checker 206 is allowed nearly a full clock cycle to determine the correctness of the parity of the outputted data. A drawback of this method, however, is that an extra clock cycle of latency is introduced on the parity indication. Some bus protocols do not allow the parity indication to lag the data by a clock cycle. In such cases, the data out would also have to be latched, thus, delaying both the data and the parity indication by a clock cycle.

Therefore, there is a need for a method and/or apparatus that addresses at least some of the latencies associated with conventional memories.

SUMMARY OF THE INVENTION

The present invention provides an apparatus for storing a plurality of data units in sequence. A trusted register that has a memory slot is used in conjunction with a memory array. The data unit stored by the trusted register is also at a predetermined location in the sequence. Because a trusted register is used, the data unit is unchecked by parity check when retrieved. However, a memory array having a plurality of memory slots is employed, where parity checks are performed. Therefore, by employing the trusted register, the speed of the apparatus can be increased.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
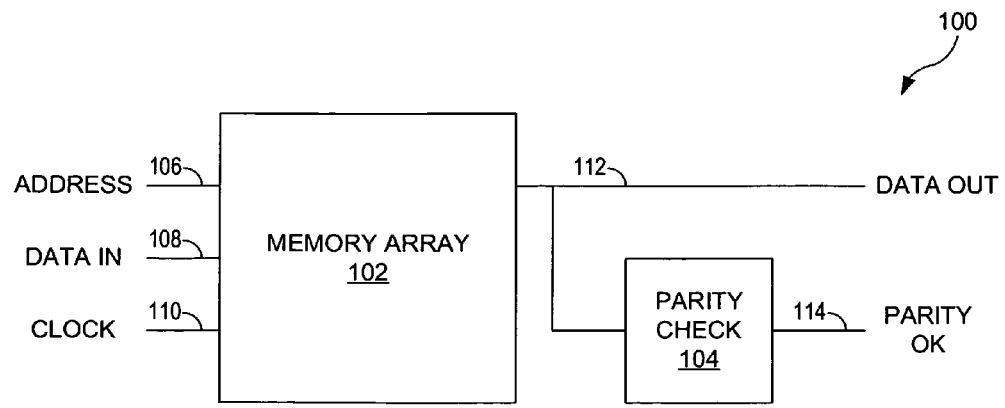
FIG. 1 is a block diagram depicting a conventional memory utilizing a parity check.
Figure 2:
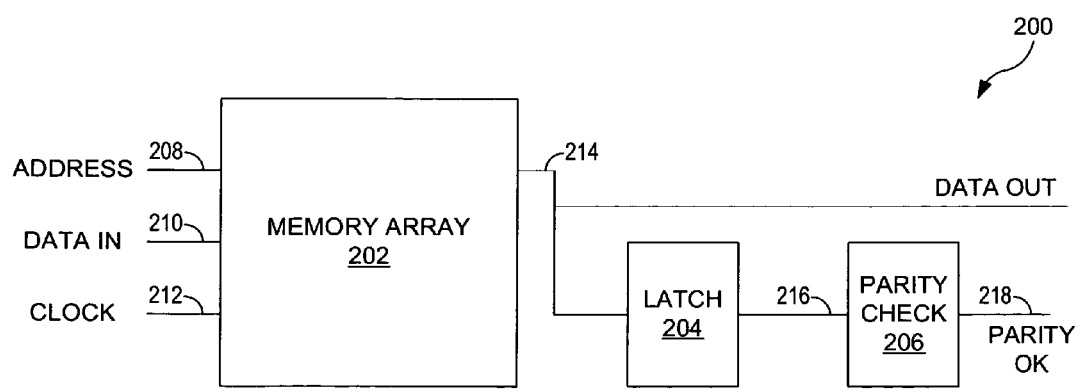
FIG. 2 is block diagram depicting a conventional memory utilizing a latched parity check.
Figure 3:
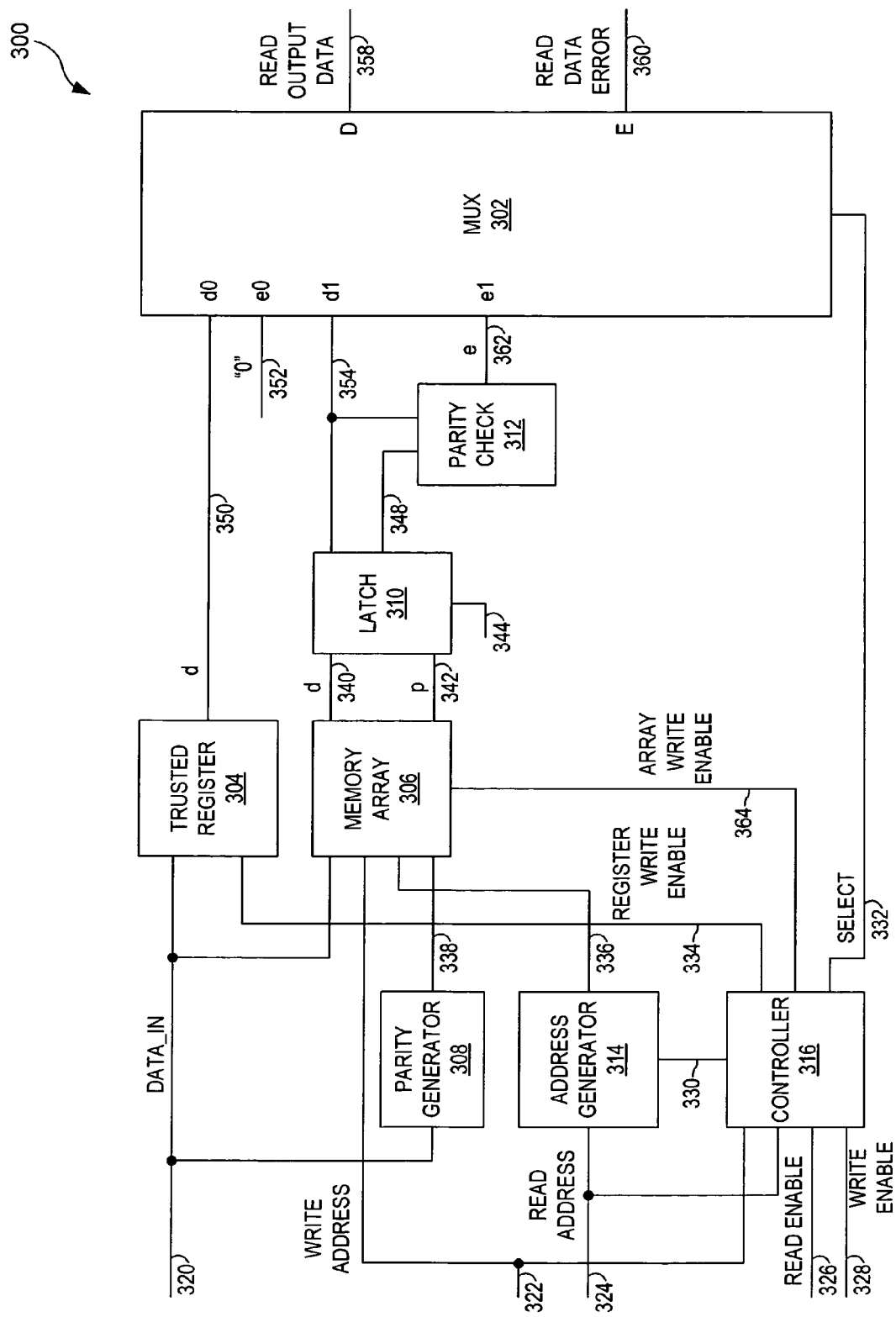
FIG. 3 is a block diagram depicting a modified memory that utilizes a trusted register with a parity check error detection circuit.

Referring to FIG. 3 of the drawings, the reference numeral 300 generally designates a modified memory that utilizes a trusted register with a parity check error detection circuit. The memory 300 comprises a multiplexer (mux) 302, a trusted register 304, a parity generator 308, a memory array 306, a latch 310, a parity check 312, an address generator 314, and a controller 316.

A substantial difference between the memory 200 and the memory 300 is the use of a trusted register 304. A trusted register 304 is a data storage device that has the ability to maintain data without the susceptibility to data corruption that exists with the memory array 306. The trusted register 304 is generally more complex and robust, which usually results in higher power demands. Therefore, it is not feasible to manufacture an entire memory module utilizing the same technology as is available for the memory array 306. When utilizing the trusted register 304, consuming devices, such as a synergistic processing unit (SPU), are simply informed to trust the output of the trusted register 304 to avoid error checking of outputted data from the trusted register 304. Also, a trusted register 304 can be integrated into the memory array macro and does not have to be a separate component. Additionally, for the configuration depicted in FIG. 3, the trusted register is enabled to store data for the first memory slot or slot "0" of the memory 300; however, the trusted register 304 can be configured to store data for any of the memory slots available.

In order for the memory 300 to function, the memory receives control data and other data through various communication channels. The trusted register 304, the parity generator 308, and the memory array 306 receive write data through a first communication channel 320. The memory array 306 and the controller 316 receive write addresses through a second communication channel 322. The address generator 314 and the controller 316 receive read Addresses through a third communication channel 324. The controller also receives a read enable signal and a write enable signal through a fourth communication channel 326 and a fifth communication channel 328, respectively.

Once all of the data is transmitted to the various components of the memory 300, updated information is intercommunicated through other communication channels. The controller transmits a register write enable signal to the trusted register 304 through a sixth communication channel 334 and an array write enable signal to the memory array 306 through a seventh communication channel 364. The controller 316 also transmits select signals to the mux 302 through an eighth communication channel 332. Control signals are also transmitted to the address generator 314 from the controller 316 through a ninth communication channel 330. The memory array 306 receives a parity signal from the parity generator 308 and read addresses from the address generator 314 through a tenth communication channel 338 and an eleventh communication channel 336, respectively. The trusted register 304 can then transmit data for a memory slot, specifically memory slot "0," to the mux 302 through a twelfth communication channel 350. The memory array 306 can then transmit data and parity for stored data to the latch 310 through a thirteenth communication channel 340 and a fourteenth communication channel 342, respectively. The latch 310 is also clocked, receiving a clocking signal through a fifteenth communication channel 344. The latch 310 the can then transmit read data to the parity check 312 and the mux 302 through a sixteenth communication channel 354. The latch 310 also transmits parity data, measured at storage, to the parity check 312 through a seventeenth communication channel 348. Once a parity check has been completed, the parity check 312 can transmit a signal to the mux 302 through an eighteenth communication channel 362. Also a "0" signal is transmitted to the mux 302 through a nineteenth communication channel 352. Based on all of the information that the mux 302 receives, a read output data signal and a read data error signal can be transmitted through a twentieth communication channel 358 and a twenty-first communication channel 360, respectively.

Figure 4:
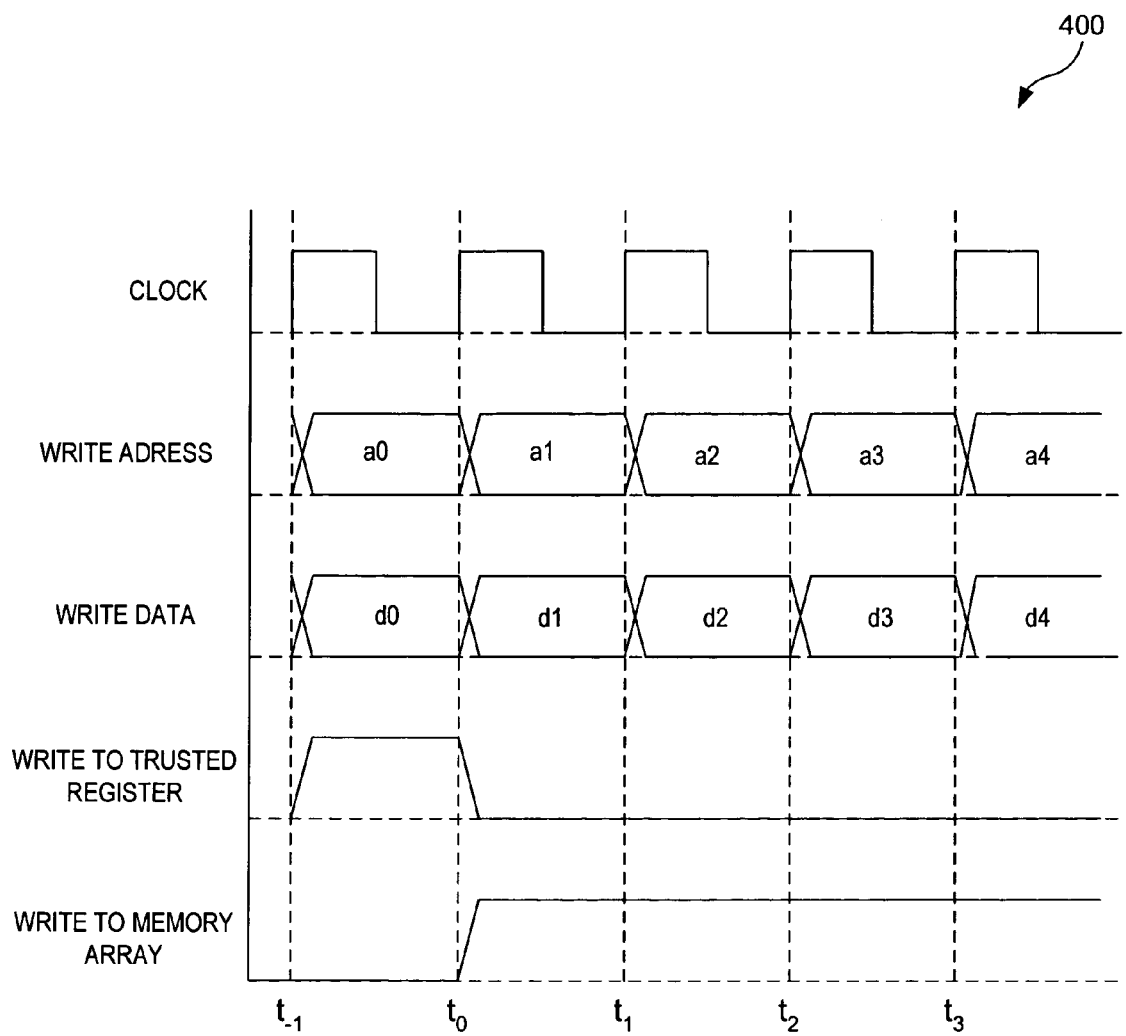
FIG. 4 is a timing diagram depicting data write cycles associated with the modified memory that utilizes a trusted register with a parity check error detection circuit.

In order to partially describe the functionality of the memory 300, the timing diagram of writing data from memory should be examined. Referring to FIG. 4 of the drawings, the reference numeral 400 generally designates a timing diagram depicting data write cycles associated with the modified memory that utilizes a trusted register with a parity check error detection circuit. Modified memory 300 is useful for devices such as bridges which access their buffers in a sequential manner. For example, the modified memory 300 takes advantage of the fact that such devices always start reading their memory buffers at location 0 and then increase the address sequentially.

At time $t_{-1}$, there is a rising clock edge. On this first rising clock edge, a write signal from the controller 316 to the trusted register 304 is initiated through the sixth communication channel 334, which is caused by the assertion of the fifth communication channel 328. At approximately the same time that a signal to write to the trusted register is initiated, write data is transmitted to the trusted register through the first communication channel 320.

At time $t_0$, there is a second rising clock edge. On this second rising clock edge, a write enable signal from the controller 316 to the address generator 314 is initiated through the seventh communication channel 364. At approximately the same time that the write enable signal to the address generator 314 is initiated, a write address signal is transmitted to the memory array 306 through the second communication channel 322, and a data signal is transmitted to the memory array 306 and to the parity generator 308 through the first communication channel 320. Then, the process continues for the remaining slots in the memory array 306.

The difference in the write cycles of the memory 300 and other memories, such as the memory 200, is that the first location of data is written to a trusted register 304. The write usage of the memory array is sequential, so it is relatively uncomplicated to assign the first data location to the trusted register 304. However, the advantages of using the trusted register 304 are not quite as apparent during the write cycles because the latency for parity check does not exist. However, it is conceivable that utilization of a trusted register, such as the trusted register 304, would result in better performance during write cycles in other error detection schemes.

Figure 5:
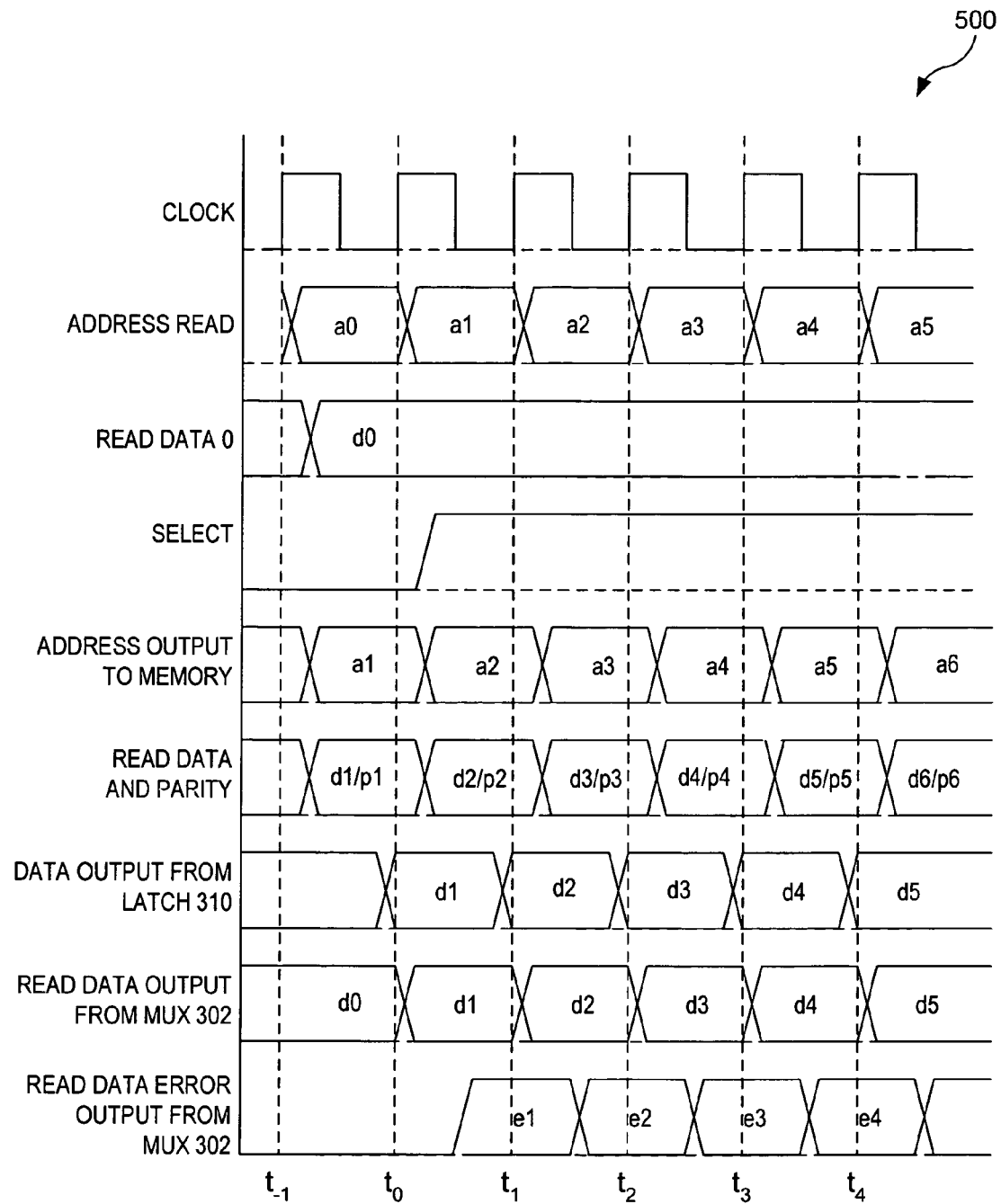
FIG. 5 is a timing diagram depicting data read cycles associated with the modified memory that utilizes a trusted register with a parity check error detection circuit.

In order to partially describe the remaining functionality of the memory 300, the timing diagram of reading data from memory should be examined. Referring to FIG. 5 of the drawings, the reference numeral 500 generally designates a timing diagram depicting data read cycles associated with the modified memory that utilizes a trusted register with a parity check error detection circuit.

At $t_{-1}$, address 0 is presented to the controller 316 and the address generator 314 through the third communication channel 324. The address generator 314 generates and transmits address 1 to the memory array 306 through the eleventh communication channel 336 as an address input. Address 1 is used to access location 1 in the memory array 306, during clock cycle t-1. The trusted register 304 contains data for memory location 0 and is connected to multiplexer 302 through the twelfth communication channel 350.

During clock $t_{-1}$, the multiplexer selects the trusted register 304 contents and outputs this data onto Read Output Data through the twentieth communication channel 358. At the same time, since the data from the trusted register 304 is correct, the Read Data Parity Error signal, which is output on the twenty-first communication channel 360, is forced to logic '0'. By selecting input from the trusted register 304, the Read Data Parity Error signal that is output from the multiplexer 302 is always '0'.

At the second clock rising edge, to, memory array 306 presents location 1 data bits on the thirteenth communication channel 340 and an associated parity bit on the fourteenth communication channel 342 to latch 310. Parity checking on location 1 data of the memory array 306 then occurs during clock cycle $t_0$. At the rising edge of clock to, the controller 316 sets the select signal to logic '1', which is communicated through the eighth communication channel 332. Having the select signal at logic '1' allows the multiplexer 302 to read input from the latch 310 and parity check 312 transmitted on the sixteenth communication channels 354 and the eighteenth communication channel 362, respectively. The outputs of latch 310 and parity check 312 can then be routed to the Read Output Data channel 358 and Read Data Error Output channel 360 to allow for sampling at the rising edge of clock $t_1$.

Since Trusted Register 304 does not need a parity check to be performed, the data reading of memory location 1 can be initiated at the same time that the trusted register 304 is outputting data to the mux 302. The sequential access of data from the memory array 306 can continue in a pipelined fashion where the memory array data for location n+1 is accessed when address n is present on the address bus, which is the third communication channel 324. The modified memory 300 allows a full clock for checking parity from the memory array 306. Therefore, overall performance is increased because clock frequency can be higher than a memory array, such as the memory array 102, and the latency is one clock less than a memory array, such as the memory array 202.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for storing a plurality of data units in sequence, comprising:
    a trusted register having at least one memory slot, wherein at least one data unit of the plurality of data units at a predetermined location in the sequence is stored in the at least one memory slot, and wherein the at least one data unit is not checked with a parity check when retrieved from the at least one memory slot; and
    a memory array having a plurality of memory slots for storing the plurality of data units that remain, wherein data units retrieved from memory array are parity checked.

2. The apparatus of claim 1, wherein the trusted register further comprises storage for a data unit from the first location in the sequence.

3. The apparatus of claim 1, wherein the apparatus further comprises a parity generator, wherein the parity generator determines parity of the plurality of data units upon entry of data units to the memory array.

4. The apparatus of claim 1, wherein the apparatus further comprises a parity checker that is at least configured to check the parity of data units retrieved from the memory array.

5. The apparatus of claim 1, wherein the apparatus further comprises a mux that is at least configured to receive data units from the trusted register and the memory array.

6. A method for writing a plurality of data units in sequence to a memory device, comprising:
    receiving a write enable signal for a trusted register at a predetermined location in the sequence;
    writing at least one data unit to the trusted register when the trusted register is enabled;
    receiving a write enable signal for a memory array for remaining locations in the sequence; and
    writing data units to the memory array when the memory array is enabled.

7. The method of claim 6, wherein the method further comprises receiving a clocking signal that enables writing on an edge.

8. The method of claim 6, wherein the step of receiving a write enable signal for a trusted register further comprises receiving a write enable signal for a trusted register for a first location in the sequence.

9. The method of claim 6, wherein the method further comprises determining an expected parity of data units that are written to the memory array.

10. The method of claim 9, wherein the method further comprises storing the expected parity.

11. A method for reading a plurality of data units in sequence to a memory device, comprising:
    initiating a reading of a first data unit from a trusted register at a predetermined location in the sequence;
    forwarding an address of a second data unit at a first location in the sequence subsequent to the predetermined location to a memory array at approximately the same time the read of the first data unit from the trusted register is initiated;
    latching expected data and corresponding parity for the second data unit while the first data unit is read; and
    initiating of a reading of a third data unit while transmitting data and corresponding parity for the second data unit and after the first data unit is read.

12. The method of claim 11, wherein the method further comprises:
    initiating a reading of each subsequent data unit in the sequence in order; and
    transmitting expected data and corresponding parity for each data unit of each subsequent data unit in the sequence in order while initiating of the reading of data and corresponding parity for a next data unit of the sequence.

13. The method of claim 11, wherein the step of initiating a reading of a first data unit from a trusted register further comprises initiating a reading of a first data unit from a trusted register from a first location in the sequence.

14. The method if claim 11, wherein the method further comprises:
    determining the computed parity of each data unit in the sequence read from the memory array; and
    comparing the computed parity of each data unit with a corresponding expected parity of each data unit.

15. A computer program product for writing a plurality of data units in sequence to a memory device, the computer program product having a medium with a computer program embodied thereon, the computer program comprising:
    computer code for receiving a write enable signal for a trusted register at a predetermined location in the sequence;
    computer code for writing at least one data unit to the trusted register when the trusted register is enabled;
    computer code for receiving a write enable signal for a memory array for remaining locations in the sequence; and
    computer code for writing data units to the memory array when the memory array is enabled.

16. The computer program product of claim 15, wherein the computer program product further comprises computer code for receiving a clocking signal that enables writing on an edge.

17. The computer program product of claim 15, wherein the computer code for receiving a write enable signal for a trusted register further comprises computer code for receiving a write enable signal for a trusted register for a first location in the sequence.

18. The computer program product of claim 15, wherein the computer program product further comprises computer code for determining an expected parity of data units that are written to the memory array.

19. The computer program product of claim 18, wherein the computer program product further comprises computer code for storing the expected parity.

20. A computer program product for writing a plurality of data units in sequence to a memory device, the computer program product having a medium with a computer program embodied thereon, the computer program comprising:
    computer code for initiating a reading of a first data unit from a trusted register at a predetermined location in the sequence;
    computer code for forwarding an address of a second data unit at a first location in the sequence subsequent to the predetermined location to a memory array at approximately the same time the read of the first data unit from the trusted register is initiated;
    computer code for reading expected data and corresponding parity for the second data unit while the first data unit is read; and
    computer code for initiating of a reading of a third data unit while transmitting the data and the corresponding parity for the second data unit and after the first data unit is read.

21. The computer program product of claim 20, wherein the computer program product further comprises:
    computer code for initiating a reading of each subsequent data unit in the sequence in order; and
    computer code for transmitting expected data and corresponding parity for each data unit of each subsequent data unit in the sequence in order while initiating of the reading of data and corresponding parity for a next data unit of the sequence.

22. The method of claim 20, wherein the computer code for initiating a reading of a first data unit from a trusted register further comprises computer code for initiating a reading of a first data unit from a trusted register from a first location in the sequence.

23. The method if claim 20, wherein the method further comprises:
    computer code for determining the computed parity of each data unit in the sequence read from the memory array; and
    computer code for comparing the computed parity of each data unit with a corresponding expected parity of each data unit.

* * * * *